Figure 1:
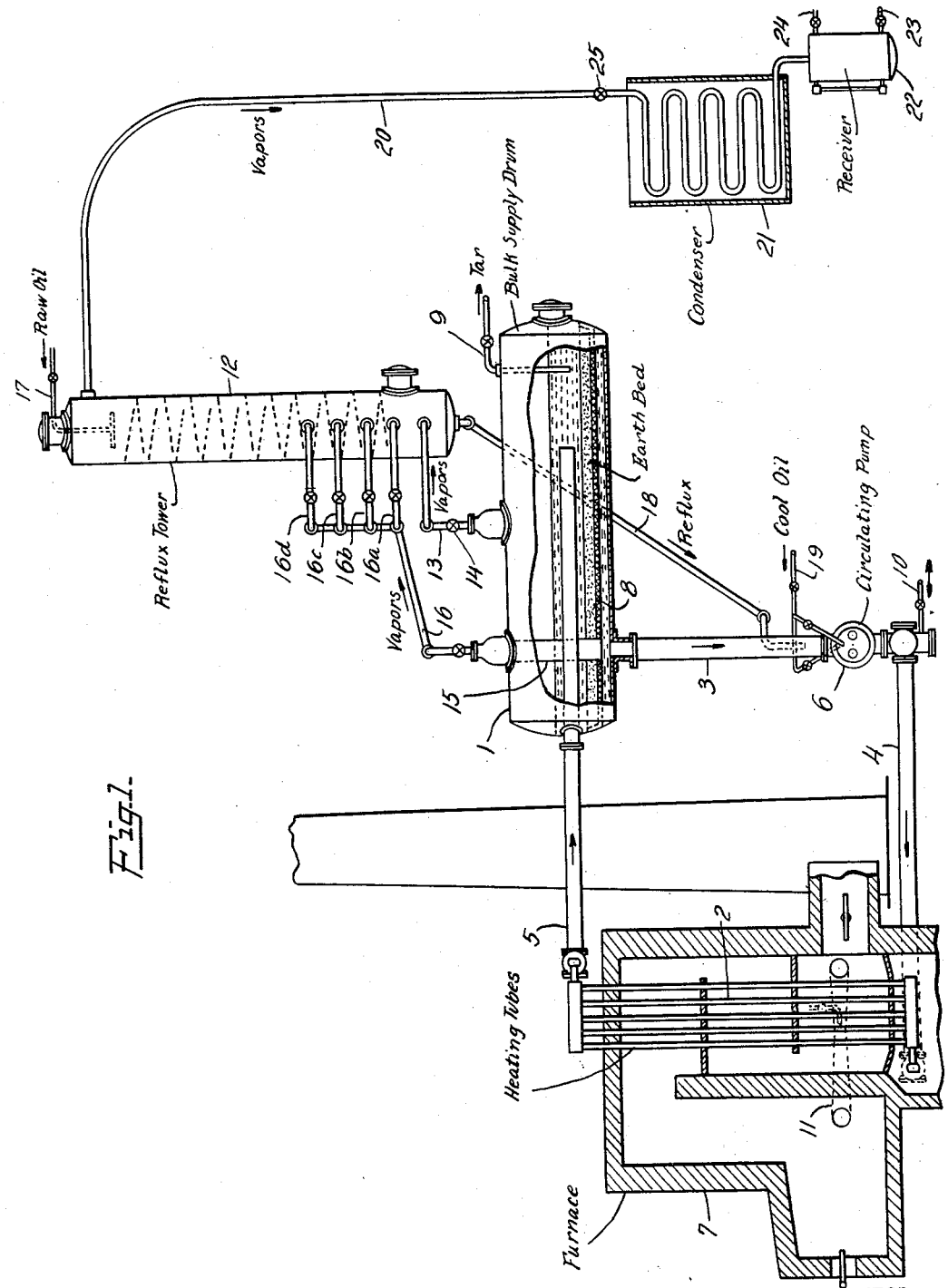

May 26, 1931. E. W. ISOM 1,807,241
ART OF CRACKING HYDROCARBON OILS
Filed Sept. 27, 1927  6 Sheets-Sheet 2

INVENTOR
Edward W. Isom
BY
ATTORNEYS

May 26, 1931.   E. W. ISOM   1,807,241
ART OF CRACKING HYDROCARBON OILS
Filed Sept. 27, 1927   6 Sheets-Sheet 3

INVENTOR
Edward W. Isom
BY
Rector, Hibben, Davis & Macauley
ATTORNEYS

May 26, 1931.   E. W. ISOM   1,807,241
ART OF CRACKING HYDROCARBON OILS
Filed Sept. 27, 1927   6 Sheets-Sheet 4

INVENTOR
Edward W. Isom
BY
Rector, Hibben, Davis & Macauley
ATTORNEYS

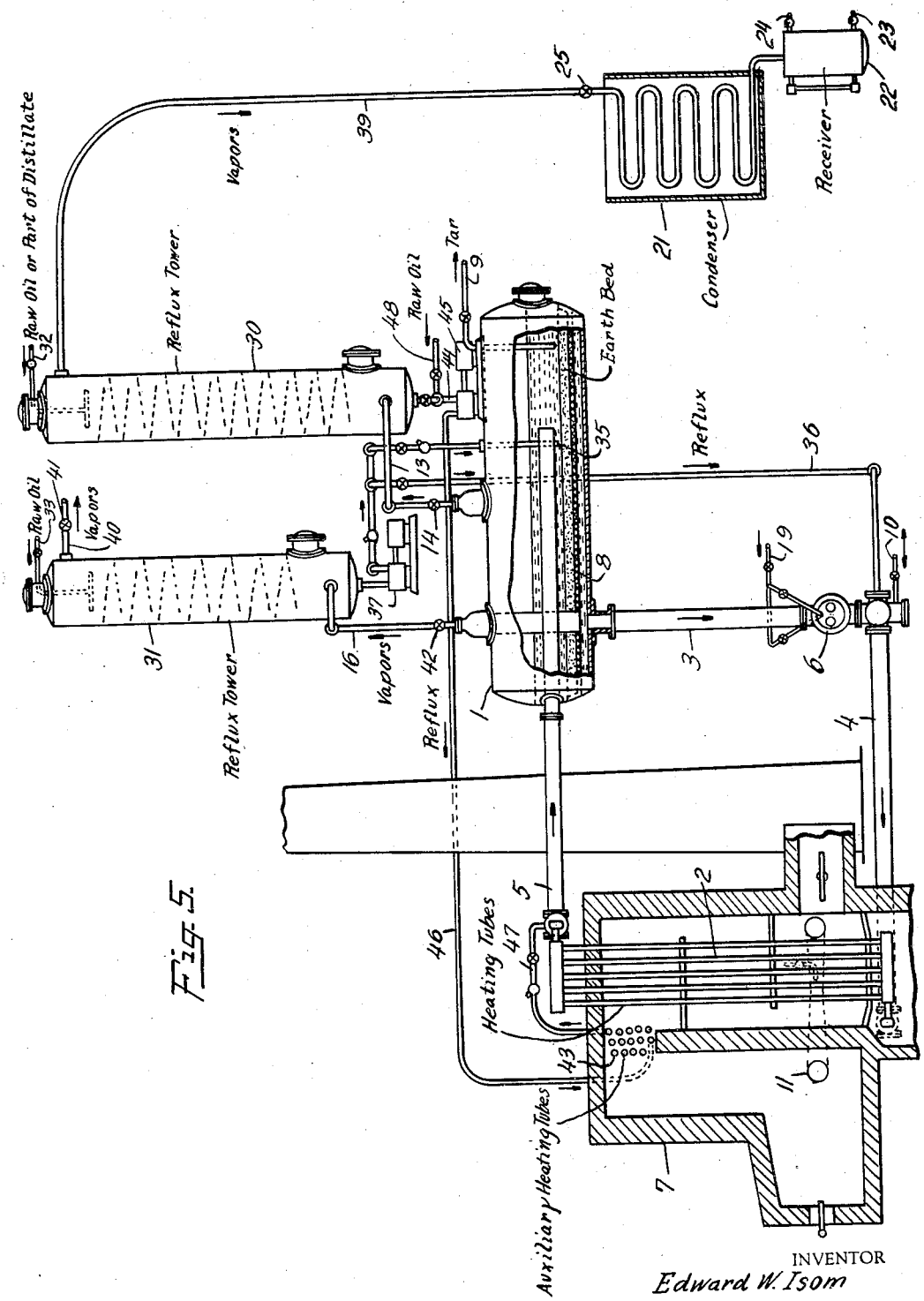

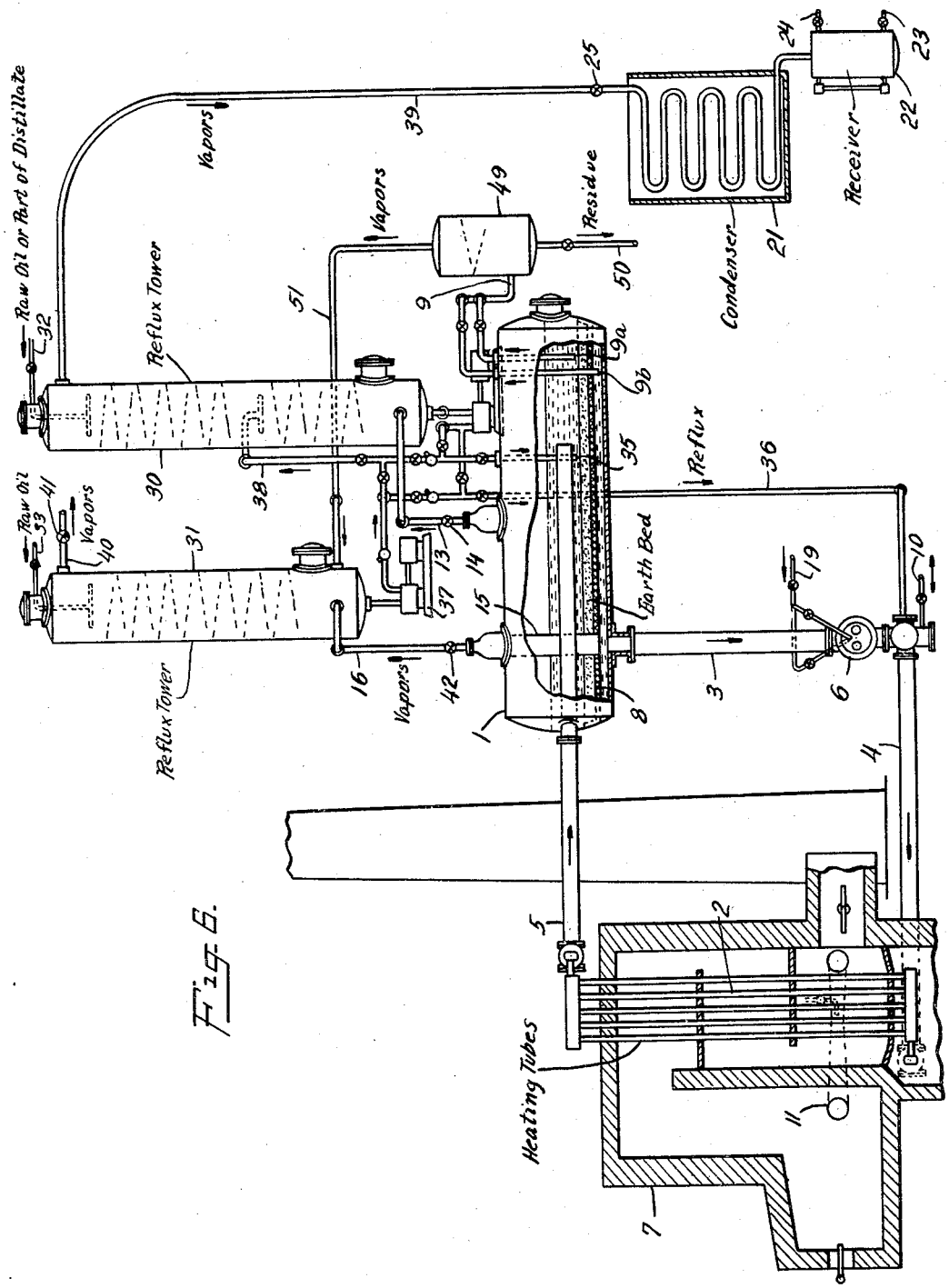

Patented May 26, 1931

1,807,241

UNITED STATES PATENT OFFICE

EDWARD W. ISOM, OF SCARSDALE, NEW YORK, ASSIGNOR TO SINCLAIR REFINING COMPANY, OF NEW YORK, N. Y., A CORPORATION OF MAINE

ART OF CRACKING HYDROCARBON OILS

Application filed September 27, 1927. Serial No. 222,257.

This invention relates to improvements in the cracking of heavier and higher boiling hydrocarbon oils, such as gas oil, for the production therefrom of lighter and lower boiling hydrocarbon oils, such as gasoline.

More particularly, this invention relates to improvements in the cracking of heavier and higher boiling hydrocarbon oils by distillation under pressure as described in Letters Patent No. 1,634,666 issued to the Sinclair Refining Company, July 5, 1927, on an application of Eugene C. Herthel and Harry L. Pelzer.

According to the present invention, a charge of oil is circulated and recirculated from a bulk supply drum through heating tubes and back to the bulk supply drum and a bed of absorbent or filtering or desulphurizing material is maintained in the bulk supply drum extending entirely across the path of the circulating charge of oil, the oil is heated to a cracking temperature in the heating tubes and vapors are taken off from the bulk supply drum under pressure, and circulation of the charge of oil is promoted by maintaining a substantial pressure drop through the bed of absorbent or filtering or desulphurizing material.

This maintenance of a substantial pressure differential through the bed of absorbent or filtering or desulphurizing material is one of the important features of the present invention and, in the combined operation, contributes to several important advantages pertaining to the invention.

One particularly advantageous way of maintaining this pressure differential is to take off vapors from the bulk supply drum above the bed of absorbent or filtering or desulphurizing material under pressure and to take off vapors from beneath the bed under a lower pressure. The vapors from above the bed and from below the bed may then be separately discharged, or they may be discharged into a common reflux tower from which reflux condensate is returned to the circulating charge of oil, the pressure on the vapors taken off from above the bed being reduced to correspond to the pressure at which the vapors from beneath the bed enter the tower before the vapors taken off under higher pressure are discharged into the tower.

The invention thus provides improvements which relate particularly to circulation of the charge of oil undergoing pressure distillation. The invention, however, also includes several other improvements which will be apparent as the description proceeds.

The invention will be further and more particularly described by description of several different operations embodying various features of the invention. It is intended and will be understood that this more detailed description is by way of example and that the invention is not specifically limited to the particular operations described or to operations carried out in the particular apparatus described.

The accompanying drawings illustrate, diagrammatically and conventionally, several forms of apparatus adapted for carrying out different operations embodying the invention, and different features of the invention, and the invention will be further described in connection therewith. Each of the six figures of drawings represents, in elevation and partly in section and with parts broken away, a pressure still system adapted for carrying out an operation embodying the invention.

The pressure still proper, in the apparatus illustrated in the drawings, is of the general type described in Letters Patent No. 1,634,666, mentioned above. This pressure still comprises a bulk supply drum 1, a battery of heating tubes 2, and circulating connections 3, 4 and 5 including circulating pump 6 for circulating oil from the bulk supply drum upwardly through the heating tubes and back to the bulk supply drum. The heating tubes 2 are arranged in the heating flue of a furnace 7. A support 8 adapted to permit free passage of oil but to retain finely divided solid material is arranged in the bulk supply drum and extending entirely across the bulk supply drum between the circulating connections 3 to the battery of heating tubes and the circulating connections 5 from the battery of heating tubes. In operation, a bed of finely divided absorbent or filtering or desulphurizing material is arranged on this support so as to be submerged in the body of oil in the bulk supply drum. The bulk supply drum 1 and the circulating connections 3, 4 and 5 are with advantage lagged or thermally insulated to minimize heat loss.

Another advantageous form of support for the bed of finely divided solid material is described in application Serial No. 184,296 filed April 16, 1927, by Harry L. Pelzer.

The pumps described in applications Serial Nos. 197,209 and 197,210 filed June 7, 1927, by Thomas de Colon Tifft are particularly adapted for use as circulating pumps in carrying out the present invention.

A battery of heating tubes of the type described in application Serial No. 197,035 filed June 7, 1927, by Harry L. Pelzer may be substituted for the battery of heating tubes illustrated.

Connection 9 is provided for discharging pitch laden oil or tar during the operation, as described in Letters Patent No. 1,634,666, mentioned above. This connection may be arranged to discharge tar from above the bed of finely divided solid material or from below the bed of finely divided solid material (see Fig. 6). Connection 10 is provided for initially charging the still and for pumping out the still at the end of a run.

Connections 11, with suitable forcing means, are provided for recirculating over the heating tubes in admixture with fresh hot products of combustion from the fire-box of the furnace a part of the heating gases which have passed thereover as described in Letters Patent Nos. 1,574,546 and 1,574,547 issued to the Sinclair Refining Company, February 23, 1926, on applications of John E. Bell.

The bed of finely divided material carried on the support 8 may comprise, for example, 15–30 mesh fuller's earth in a depth of from 7 to 18 inches. In place of fuller's earth, other absorbent clays may be used. Other absorbent or filtering or desulphurizing materials useful in carrying out the invention include ground coke, iron oxide, calcined bauxite and silica gel.

The features of the pressure still proper just described are common to the several pressure still systems illustrated in the several figures and corresponding parts have been designated by the same reference characters in the several figures.

Referring more particularly to Fig. 1, a reflux tower 12 is arranged above the bulk supply drum 1. This tower may be of ordinary baffle construction, as illustrated. Vapors from the upper part of the bulk supply drum 1 escape into the lower end of the tower 12 through connection 13, this connection including a pressure reducing and regulating valve 14. Vapors from beneath the support 8 and the superimposed bed of finely divided material escape through the vapor passage 15 and connection 16 to a higher point in the tower 12. Branch connections 16a, 16b, 16c and 16d are provided to permit discharge of vapors through connection 16 into tower 12 at one or more of a series of successively higher points, as described below. In the apparatus illustrated, the reflux tower 12 is lagged or thermally insulated and the refluxing therein is effected and controlled by regulated direct introduction of raw oil, or other refluxing medium, for example a part of the distillate product, into the upper end of the tower through connection 17. The refluxing may also be effected or controlled by indirect heat exchange with a suitable refluxing medium. Connection 18, discharging into circulating connection 3 adjacent to the inlet to the circulating pump 6, is provided for reintroducing into the circulating still charge the reflux condensate, together with any admixed raw oil. Raw oil, or additional raw oil, may also be supplied to the circulating still charge through the bearings of the circulating pump 6 by means of connection 19.

Vapors from the reflux tower 12 escape through connection 20 to condenser 21 which in turn discharges into receiver 22. From this receiver the distillate product is discharged through connection 23 and any uncondensed vapors and gases through connection 24. The pressure may be reduced between the reflux tower 12 and the condenser 21 by means of valve 25, or the pressure prevailing in the reflux tower may be maintained through the condenser and reduced by means of suitable valves arranged beyond the condenser or receiver.

In one way of carrying out the invention in apparatus of the type illustrated, for example, the still is initially charged with say about 8,000 gallons of gas oil and brought to cracking conditions of temperature and pressure in the usual way. In such operation, the bed of finely divided solid material may consist of from 4 to 7 tons of 15–30 mesh fuller's earth. After the still is brought to cracking conditions of temperature and pressure, vapors are permitted to escape through connection 13 and the introduction of raw oil through connection 17 is begun. Vapors remaining uncondensed in the reflux tower in turn are permitted to escape through connection 20 to the condenser 21 from which the condensed distillate product is discharged into receiver 22 and thence to a suitable place of storage or distribution through connection 23. When the introduction of raw oil is begun, or shortly thereafter, the discharge of pitch laden oil or tar through connection 9 is also started. At this point in the operation distillate may be taken off at a rate of about 1,000 gallons per hour or somewhat more, tar discharged at a rate of about 1,500 gallons per hour or somewhat less, and raw oil supplied at a rate of about 2,500 gallons per hour. From 100 to 500 gallons per hour or somewhat more of this raw oil may be supplied through connection 19, the balance through connection 17. Likewise at this point in the operation, the pressure in the upper part of the bulk supply drum is maintained in the neighborhood of from 250 to 300 pounds per square inch, for example, while the pressure in the reflux tower is maintained at a value say 10 to 20 pounds per square inch less by regulation of valves 25 and 14. That is, if the pressure in the upper part of the bulk supply drum is maintained at 280 pounds per square inch, the pressure in the reflux tower is maintained at from 260 to 270 pounds per square inch. The space in the lower part of the bulk supply drum, beneath support 8, is maintained at approximately the value prevailing in the reflux tower by maintaining free communication through vapor passage 15 and connection 16.

The resulting pressure differential between the upper part of the bulk supply drum and the lower part of the bulk supply drum acts to drive the unvaporized oil discharged from the battery of heating tubes under pressure from the circulating pump 6 through the bed of fuller's earth, or other finely divided material, into the lower part of the bulk supply drum to be recirculated through the battery of heating tubes. Due to the drop in pressure through the bed of earth or finely divided solid material, additional vaporization takes place in the lower part of the bulk supply drum and these vapors escape through vapor passage 15 and connection 16. There is a slight pressure differential between the lower end of the reflux tower and the lower part of the bulk supply drum due to resistance to flow through connection 18; and there is a similar progressive but slight drop in pressure as the vapors flow upwardly through the reflux tower. The several connections 16a, 16b, 16c and 16d are provided to permit introduction of the vapors escaping from beneath the support 8 through connection 16 into the reflux tower at a point where the pressure is a slight amount less than that prevailing beneath the support 8 to maintain the vapor flow. Connection 16 may be connected with the reflux tower 12 to any one or more of these several connections as required by means of the valves illustrated.

It is intended and will be understood that the operation just described, particularly the figures as to amounts and pressures, is given simply by way of illustration. The several features of the invention embodied in this operation may also be embodied in other operations carried out in other apparatus, at different pressures and with different charging stocks.

By maintaining the pressure in the bulk supply drum beneath the bed of absorbent or filtering or desulphurizing material at a lower value than that prevailing in the upper part of the bulk supply drum, circulation of the still charge is promoted. Among the resulting improvements in operation may be mentioned higher velocity through the heating tubes with consequent improvement in uniformity of rate of heat transfer therethrough as well as an increase in the effective contact between the circulating still charge and the bed of absorbent or filtering or desulphurizing material. The drop in pressure through the bed of absorbent or filtering or desulphurizing material also assists in vaporizing from the oil about to be recirculated through the heating tubes lighter constituents, particularly constituents suitable as components of the desired distillate product, which might otherwise be subjected to overcracking with consequent loss if recirculated through the heating tubes. The constituents vaporized from beneath the bed, however, also assist in promoting circulation through the bed of absorbent, filtering or desulphurizing material.

During operation, pitch laden oil or tar may be discharged from the body of oil in the bulk supply drum, either from above or from below the bed of absorbent or filtering or desulphurizing material submerged therein and extending thereacross. Pitch laden oil or tar discharged from above the bed of absorbent or filtering or desulphurizing material contains a greater concentration of constituents absorbable or removable by the action of the bed than pitch laden oil or tar discharged from below the bed. However, in some cases, circulation of the still charge may be further promoted by discharging pitch laden oil or tar from beneath the bed of absorbent or filtering or desulphurizing material, the oil components of the discharged tar in such operation assisting in diluting the suspension or solution of pitch or pitchy or carbonaceous material circulating through the bed.

Figure 2:
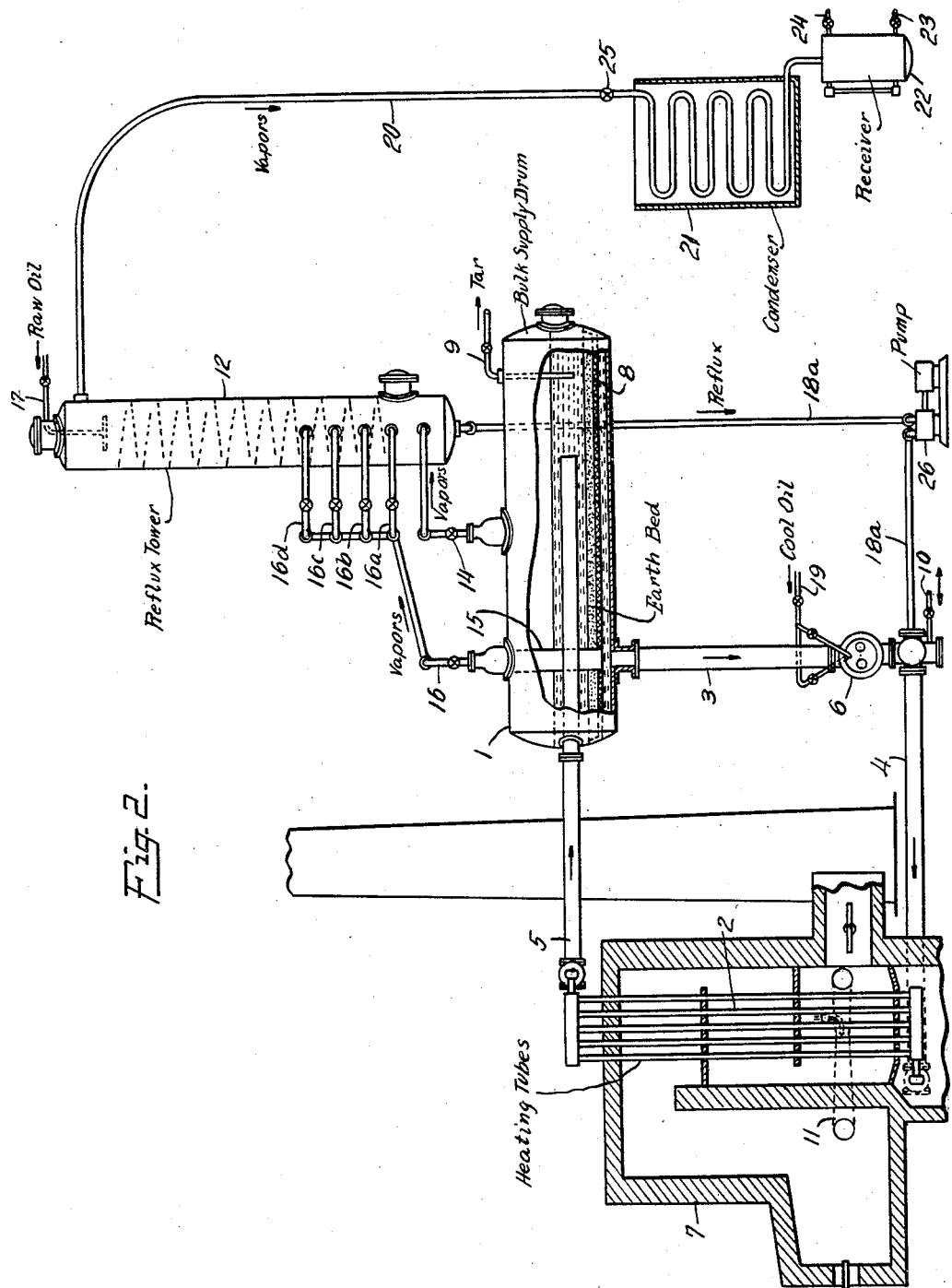

The apparatus illustrated in Fig. 2 is similar to the apparatus illustrated in Fig. 1 except in that positive forcing means are provided for reintroducing the reflux condensate from the reflux tower 12, together with any admixed raw oil, into the circulating still charge. For this purpose a pump 26 or other suitable forcing means is interposed in the reflux return connection 18a, as illustrated, and this connection is arranged to discharge into circulating connection 4 on the discharge side of the circulating pump 6. In carrying out the invention in this apparatus, the operation is conducted in substantially the same manner as has just been described in connection with the operation of the apparatus illustrated in Fig. 1. Positive return of the reflux condensate, or the oil mixture from the reflux tower, as by means of a pump, sometimes assists in making the operation more uniform and more easily controlled. In this case, also, the pressure differential between the upper part of the bulk supply drum and the lower part of the bulk supply drum is maintained by regulation of valve 14, the pressure in the reflux tower 12 being maintained and regulated by means of valve 25 or other suitable valves arranged beyond the condenser or receiver.

Figure 3:
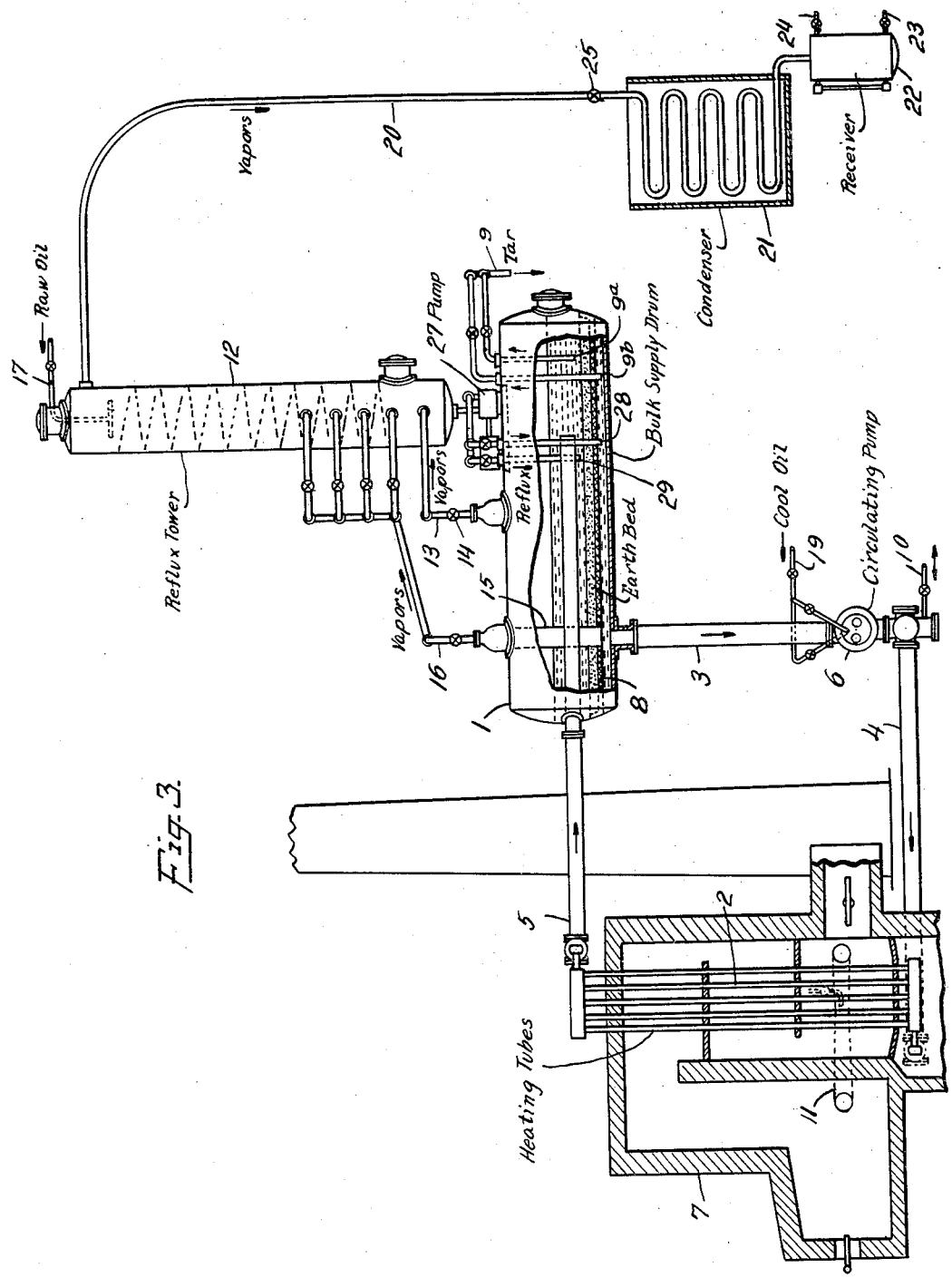

The apparatus illustrated in Fig. 3, is similar to the apparatus illustrated in Fig. 1 except in that means are provided for reintroducing the reflux condensate from the reflux tower 12, together with any admixed raw oil into the circulating still charge either above or below, or partly above and partly below, the bed of absorbent or filtering or desulphurizing material. For this purpose a pump 27 or other suitable forcing means is arranged to discharge the reflux condensate or oil mixture through either connection 28 terminating below the bed or through connection 29 terminating above the bed, or partly through both of these connections. Suitable valves for controlling the operation of these connections are provided as illustrated. In carrying out the invention in this apparatus, the operation is conducted in substantially the same manner as has just been described in connection with the operation of the apparatus illustrated in Fig. 1. The reflux condensate or oil mixture from the reflux tower includes constituents which tend to remain unvaporized under the higher pressure prevailing in the upper part of the bulk supply drum and, by returning this reflux condensate or oil mixture to the circulating charge of oil above the bed of absorbent or filtering or desulphurizing material, these constituents in particular assist in promoting circulation through the bed. Since the return of this reflux condensate or oil mixture above the bed of absorbent or filtering or desulphurizing material may also involve some heat loss due to rapid revaporization of lighter constituents, only part of the reflux condensate or oil mixture may be reintroduced above the bed to promote circulation in this manner and the balance reintroduced beneath the bed, or into the oil circulating from the bulk supply drum to the heating tubes. In one advantageous way of carrying out the invention in apparatus of the type illustrated, the reflux condensate or oil mixture from the reflux tower is during the early part of the operation introduced entirely or largely beneath the bed of absorbent or filtering or desulphurizing material and later in the operation, as the bed becomes charged with constituents separated or absorbed from the oil, introduced above the bed or introduced above the bed in progressively increasing proportion.

Since the vapors taken off from beneath the bed of absorbent or filtering or desulphurizing material are taken off under a pressure less than that under which the vapors are taken off from the upper part of the bulk supply drum, the condensate produced from the vapors taken off from beneath the bed when these vapors are subjected to a refluxing operation tends to be less refractory, that is more easily cracked, than the condensate produced from the vapors taken off from the upper part of the supply drum when these vapors are subjected to a similar operation. Likewise, the raw oil supplied to the operation is usually somewhat less refractory than the reflux condensate either from the vapors from beneath the bed or from the vapors from the upper part of the bulk supply drum or from a mixture of these vapors. For this reason, it is sometimes advantageous to subject the vapors taken off from beneath the bed of absorbent or filtering or desulphurizing material to a refluxing operation separate from that to which the vapors taken off from the upper part of the bulk supply drum are subjected. By carrying out the operation in this way, the several stocks under treatment can be handled in the manner best suited to the particular stock.

Figure 4:
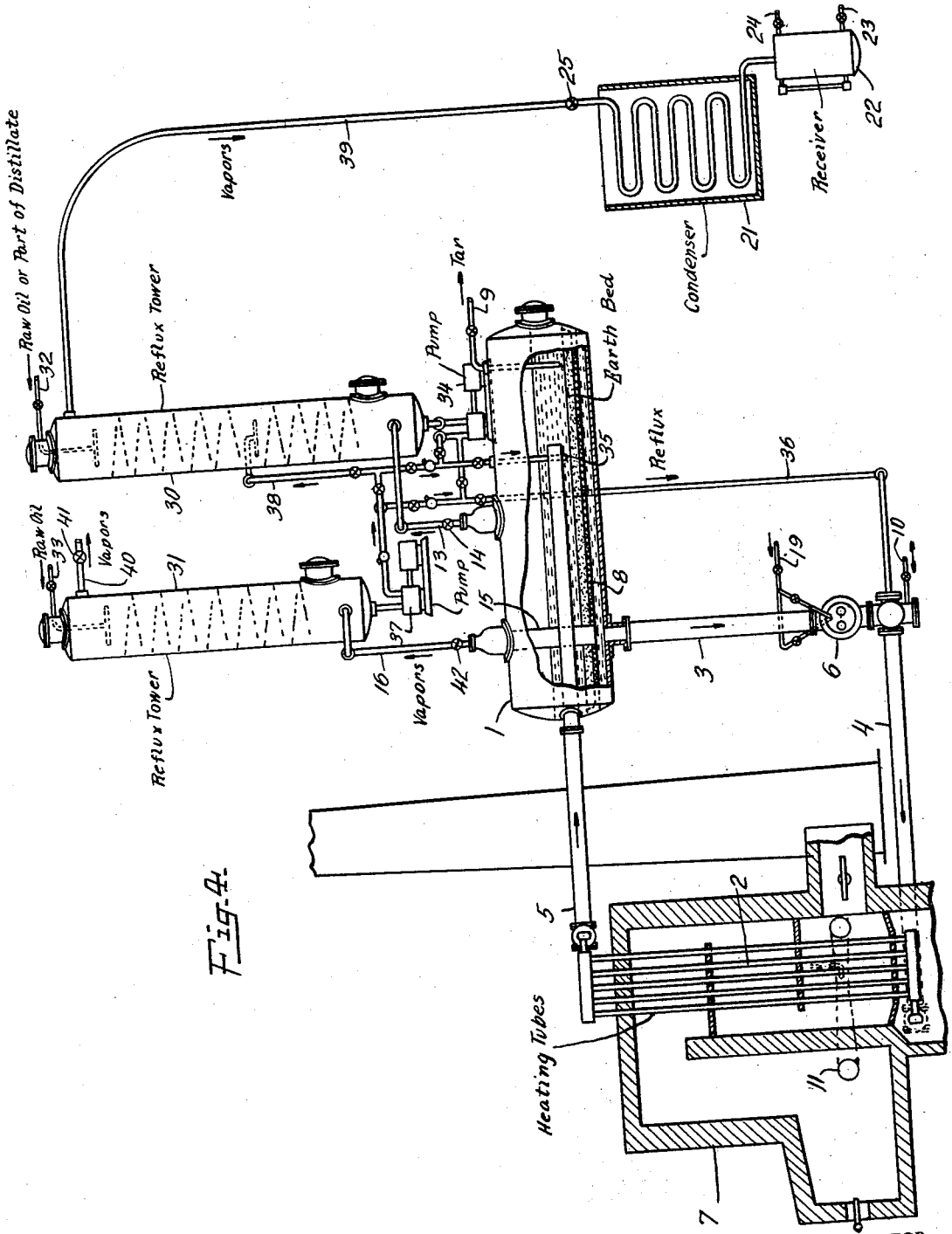

Referring more particularly to Fig. 4, two reflux towers, 30 and 31, are arranged above the bulk supply drum 1. These towers may be of ordinary baffle construction, as illustrated. Vapors from the upper part of the bulk supply drum 1 escape into the lower end of the tower 30 through connection 13, this connection including a pressure reducing and regulating valve 14. Vapors from beneath the support 8 and the superimposed bed of finely divided material escape through the vapor passage 15 and connection 16 into the lower end of the tower 31. The reflux towers 30 and 31 are advantageously lagged or thermally insulated. Connections 32 and 33 are provided for the direct introduction of a refluxing medium into the upper ends of the towers 30 and 31 respectively. By means of the pump 34, the reflux condensate or oil mixture from tower 30 may be introduced into the charge of oil in the still either through connection 35 or through connection 36 or partly through both of these connections. Similarly, by means of the pump 37, the reflux condensate or oil mixture from tower 31 may be introduced partly or wholly either through connection 35 or through connection 36 or through connection 38 into the reflux tower 30 at an intermediate point. The refluxing in either or both of the towers 32 and 33 may also be effected or controlled by indirect heat exchange with a suitable refluxing medium. Raw oil, for example, may be supplied to the operation by introduction through either or both of the towers 30 and 31, or raw oil may be supplied through the bearings of the circulating pump 6 by means of connection 19, or raw oil in addition to that introduced through the towers 30 and 31 may be supplied through connection 19. Vapors from the reflux tower 30 escape through connection 39 to condenser 21 which in turn discharges into receiver 22. From this receiver the distillate product is discharged through connection 23 and any uncondensed vapors and gases through connection 24. Vapors from the reflux tower 31 escape through connection 40 to a condenser and receiver (not shown) of construction and arrangement similar to that of condenser 21 and receiver 22. The pressure may be reduced between the reflux tower 30 and the condenser 21 by means of valve 25, or the pressure prevailing in this reflux tower may be maintained through the condenser and reduced by means of suitable valves arranged beyond the condenser or receiver; the pressure may be reduced between the reflux tower 31 and the condenser with which it communicates through connection 40 by means of valve 41, or the pressure prevailing in this reflux tower may be maintained through the connected condenser and reduced by means of similar valves arranged beyond the condenser or receiver.

In one way of carrying out the invention in apparatus of the type illustrated in Fig. 4, for example, after the still is brought to cracking conditions of temperature and pressure in the usual way, vapors are permitted to escape from the upper part of the bulk supply drum into tower 30 through connection 13 and vapors from beneath the bed of absorbent or filtering or desulphurizing material are permitted to escape into tower 31 through connection 16, and the pressure under which the vapors are taken off from the upper part of the bulk supply drum is maintained at a higher value than the pressure under which the vapors are taken off from beneath the bed. This pressure differential may be maintained by regulation of discharge of the vapors through connections 13 and 16 by valves 14 and 42 respectively, or by maintaining appropriate pressures in the two reflux towers by valves located beyond the reflux towers, for example valves 25 and 41, while maintaining substantially free communication between the upper part of the bulk supply drum and the reflux tower 30 through connection 13 and between the lower part of the bulk supply drum and the reflux tower 31 through connection 16. The resulting pressure differential between the upper part of the supply drum and the lower part of the supply drum acts to drive the unvaporized oil discharged from the battery of heating tubes under pressure from the circulating pump 6 through the bed of absorbent or filtering or desulphurizing material into the lower part of the bulk supply drum to be recirculated through the battery of heating tubes.

The reflux condensate or oil mixture from tower 30 is advantageously reintroduced into the circulating charge of oil through connection 36; where this stock is relatively refractory it is thus again heated to the cracking temperature before it can again escape from the pressure still proper as vapors. Or this reflux condensate or oil mixture, or part of it, may be reintroduced into the circulating charge of oil through connection 35 to assist in promoting circulation as previously described. For example, the reflux condensate or oil mixture from tower 30 initially may be reintroduced into the circulating charge of oil entirely or largely through connection 36 and at a later period in the operation may be introduced, or introduced in increased proportion, through connection 35. The reflux condensate from tower 31 is usually less refractory than that from tower 30, and also is usually somewhat heavier and higher boiling than the reflux condensate from tower 30. This reflux condensate, or the oil mixture containing this reflux condensate, from tower 31, or part of it, may be reintroduced into reflux tower 30 through connection 38 there to assist in the refluxing operation carried out in tower 30 and at the same time to be stripped of any light constituents suitable as components of the desired product. In this operation, the reflux condensate or oil mixture from tower 31 so introduced into tower 30 is supplied to the circulating charge of oil in admixture with the reflux condensate produced in tower 30; this composite mixture, for example, may be reintroduced into the circulating charge of oil either through connection 35 or through connection 36 or through both of these connections, as previously described. The reflux condensate or oil mixture from tower 31, or part of it, may also be reintroduced into the circulating charge of oil directly through connection 36. This reflux condensate or oil mixture from tower 31, or part of it, may also be reintroduced into the charge of oil in the bulk supply drum above the bed of absorbent or filtering or desulphurizing material through connection 35. When this reflux condensate or oil mixture is relatively less refractory, it may thus be reheated to a temperature sufficient to produce useful cracking by the hot oil products discharged from the battery of heating tubes at the same time assisting in promoting circulation of the still charge. The two refluxing operations may each be effected and controlled by the regulated introduction of raw oil or, if the total amount of raw oil to be supplied to the operation is insufficient, by the regulated introduction of raw oil in admixture with a part of the distillate product or a fraction of corresponding character. One advantageous mode of operation is to introduce as much raw oil as possible, within the limits of the required refluxing, into tower 31, to effect and regulate the refluxing in tower 30 by the introduction of the balance of the raw oil or part of it or such raw oil in admixture with a part of the distillate product or a fraction of corresponding character, and to introduce any remaining raw oil through connection 19.

In general it is advantageous to operate the two towers and to handle the reflux condensate or oil mixture from each of the two towers so that stocks of corresponding character are kept together and are subjected to those conditions prevailing in the system most appropriate for the treatment of the particular stock. For example, where the refluxing in tower 30 is effected largely or entirely by the introduction of a part of the distillate product or a fraction of corresponding character, the reflux condensate from this tower is usually relatively refractory and is advantageously returned largely or entirely through connection 36. Where a substantial proportion of raw oil of relatively less refractory character is introduced into reflux tower 30, the resulting oil mixture containing the reflux condensate, or a larger portion of it, may with advantage be reintroduced through connection 35. Usually, however, it is advantageous to supply stock reintroduced through connection 35 largely or entirely from reflux tower 31, as this stock tends to be relatively less refractory, the more refractory stock from tower 30 being reintroduced through connection 36. Similarly, it is frequently advantageous to effect the refluxing in tower 30 entirely by the introduction of a part of the distillate product or a fraction of corresponding character and to introduce the raw oil to be supplied to the operation, or as much of it as may be so introduced within the limits of the desired refluxing, into the tower 31 where the relatively less refractory components of the raw oil mix with the relatively less refractory reflux condensate from the vapors escaping from beneath the bed of absorbent or filtering or desulphurizing material. The relatively less refractory stocks may thus be concentrated in the oil mixture produced in tower 31 and the relatively more refractory stocks concentrated in the oil mixture produced in tower 30.

The apparatus illustrated in Fig. 5 is similar to the apparatus illustrated in Fig. 4 except in the provision of an auxiliary bank of heating tubes arranged in the heating furnace between the firebox and the heating flue in which the battery of heating tubes 3 are located, as described in application Serial No. 664,502 filed September 24, 1923 by Eugene C. Herthel. This auxiliary bank of heating tubes 43 is arranged in the path of the heating gases in the furnace so that the heating gases while at highest temperature and before they pass over the battery of heating tubes 2 pass over these auxiliary heating tubes. Oil circulated through the heating tubes 43 is thus subjected to the highest temperatures and the most severe conditions prevailing in the heating furnace. This auxiliary bank of heating tubes thus assists in protecting the main battery of heating tubes 2, and, at the same time, by circulating a clean stock or a relatively refractory stock through the auxiliary heating tubes these auxiliary heating tubes may be protected from the more severe conditions to which they are subjected and this stock subjected to advantageous cracking conditions, particularly where the stock is relatively refractory. In the apparatus illustrated in Fig. 5, connections including a suitable forcing means are provided for circulating the reflux condensate or oil mixture from reflux tower 30 through the auxiliary bank of heating tubes 43 and thence into the bulk supply drum of the pressure still proper. The reflux condensate or oil mixture discharged from the tower through connection 44 is forced by means of the pump 45 through connection 46 to and through the auxiliary heating tubes 43 and thence through connection 47 and circulating connections 5 into the upper part of the bulk supply drum 1.

In one way of carrying out the invention in apparatus of the type illustrated in Fig. 5, after the still is brought to cracking conditions of temperature and pressure in the usual way, vapors are permitted to escape through connections 13 and 16 into reflux tower 30 and 31 respectively and a pressure differential is maintained through the bed of absorbent or filtering or desulphurizing material in the bulk supply drum as has been described in connection with the operation of the apparatus illustrated in Fig. 4. Raw oil, particularly relatively less refractory raw oil, is introduced into tower 31 through connection 33 and the resulting oil mixture containing the reflux condensate produced in this tower is supplied to the circulating charge of oil in the pressure still proper either through connection 36 or through connection 35 or partly through both of these connections as has been described. The reflux condensate from tower 30 is forced through the auxiliary heating tubes 43 and thence into the bulk supply drum by means of pump 45. If at any time the supply of reflux condensate is insufficient, it is supplemented by raw oil supplied through connection 48, or raw oil of a relatively more refractory character may be supplied regularly through this connection during the operation to be passed through the auxiliary heating tubes 43 in admixture with the reflux condensate from tower 30. Raw oil may also be supplied to the heating tubes 43 through connection 48 while the still is being brought to operating conditions. The refluxing operation in tower 30 is advantageously carried out by introducing into the tower a part of the distillate product or a fraction of corresponding character, or relatively more refractory raw oil may be introduced into tower 30, alone or in admixture with such other refluxing medium, to effect or control the operation. Where several stocks are to be treated, the relatively less refractory stocks may thus be supplied to tower 31 through connection 33 and the relatively more refractory stocks to tower 30 through connection 32, the resulting relatively more refractory oil mixture produced in tower 30 thus being subjected to the more severe cracking conditions prevailing in the auxiliary bank of heating tubes.

The pitch laden oil or tar discharged during the operation may be reduced to coke in an externally fired shell still at atmospheric pressure and the distillate so produced returned to the operation, for example, or this pitch laden oil or tar may be distilled largely or entirely by its self-contained heat as it is discharged during the operation by reduction in pressure thereon while still at high temperature, for example, as described in application Serial No. 117,697 filed June 22, 1926 by Eugene C. Herthel and Thomas de Colon Tifft. Where the pitch laden oil or tar discharged from the operation is subjected to distillation and the distillate is returned to the cracking operation, it is advantageous to strip the distillate of any light constituents such as are suitable as components of the desired product or which are too refractory for useful treatment in the operation. In the operation of pressure still systems of the type illustrated in Figs. 4 and 5, the vapors formed during the distillation of the discharged pitch laden oil or tar may with advantage be introduced together with the vapors escaping from beneath the bed of absorbent or filtering or desulphurizing material into the reflux tower to which the latter vapors are conveyed. The heavier vaporized components of the discharged pitch laden oil or tar are usually relatively less refractory and may thus be handled with advantage in admixture with the reflux condensate from the heavier vapors discharged from beneath the bed of absorbent or filtering or desulphurizing material.

The apparatus illustrated in Fig. 6 provides for handling the vapors separated from the pitch laden oil or tar discharged from the cracking operation during distillation of the same in the reflux tower into which the vapors from beneath the bed of absorbent or filtering or desulphurizing material escape. The pitch laden oil or tar discharged either from above the bed through connection 9a or from beneath the bed through connection 9b is discharged into a vaporizing receptacle 49 through a pressure reducing valve, the pressure in the vaporizing receptacle being maintained at a value low enough to effect the vaporization of the components to be returned to the cracking operation but advantageously high enough so that residue remaining can be discharged as a liquid. The residue remaining unvaporized in the vaporizing receptacle 49 is discharged through connection 50. The vapors separated in this receptacle escape through connection 51 into the lower end of tower 31. The vapors escaping from beneath the bed of absorbent or filtering or desulphurizing material also enter the lower end of this tower through connection 16. The pressure in the reflux tower 31, and consequently the pressure in the vaporizing receptacle 49, is regulated by means of valve 41 or by other suitable valves arranged beyond the reflux tower. Usually it is advantageous to subject the discharged pitch laden oil or tar to a much greater pressure drop than is maintained through the bed of absorbent or filtering or desulphurizing material, and for this reason it is usually necessary to reduce the pressure on the vapors escaping through the vapor passage 15 from beneath the bed by means of valve 42 before these vapors enter the reflux tower 31. The pressure in the vaporizing receptacle 49, for example, may be maintained in the neighborhood of atmospheric pressure or at a somewhat higher value. Otherwise, the operation is conducted in substantially the same manner as has just been described in connection with the operation of the apparatus illustrated in Fig. 4. The vaporizing receptacle 49 is advantageously lagged or thermally insulated to maintain the temperature therein.

I claim:

1. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, and taking off vapors from beneath said bed under a lower pressure.

2. An improved method of cracking hydrocarbon oils, which comprises circulating the oil from a bulk supply drum through heating tubes and back to the bulk supply drum, heating the oil to a cracking temperature in the heating tubes, maintaining a bed of fuller's earth in the bulk supply drum extending entirely across the path of the circulating oil, taking off vapors from the upper part of the bulk supply drum under pressure, and taking off vapors from beneath said bed of fuller's earth under a lower pressure.

3. An improved method of cracking hydrocarbon oils, which comprises circulating the oil from the bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, and supplying raw oil to and discharging pitch laden oil from the circulating oil during operation.

4. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, supplying raw oil to the circulating oil during operation, and discharging pitch laden oil from the upper part of the bulk supply drum during operation.

5. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, supplying raw oil to the circulating oil during operation, and discharging pitch laden oil from beneath said bed during operation.

6. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off both from the upper part of the bulk supply drum and from beneath said bed to a refluxing operation, and reintroducing reflux condensate therefrom into the circulating oil.

7. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off both from the upper part of the bulk supply drum and from beneath said bed to a refluxing operation, and reintroducing reflux condensate therefrom into the circulating oil beneath said bed.

8. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off both from the upper part of the bulk supply drum and from beneath said bed to a refluxing operation, and reintroducing reflux condensate therefrom into the upper part of the bulk supply drum.

9. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure and after reducing the pressure thereon subjecting these vapors to a refluxing operation, and taking off vapors from beneath said bed under a pressure lower than that under which the vapors are taken off from the upper part of the bulk supply drum and subjecting these vapors to the refluxing operation in admixture with the first mentioned vapors after reduction in pressure on the first mentioned vapors.

10. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure and after reducing the pressure thereon introducing these vapors into the lower part of a reflux tower, taking off vapors from beneath said bed under a pressure lower than that under which the vapors are taken off from the upper part of the bulk supply drum, and introducing these last mentioned vapors into the reflex tower at a point higher than that at which the first mentioned vapors are introduced.

11. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off to a refluxing operation, introducing raw oil into the vapors in the refluxing operation, and returning admixed reflux condensate and raw oil from the refluxing operation to the circulating oil.

12. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off to a refluxing operation, introducing raw oil into the vapors in the refluxing operation, and returning admixed reflux condensate and raw oil from the refluxing operation to the upper part of the bulk supply drum.

13. An improved method of cracking hydrocarbon oils, which comprises circulating the oil from a bulk supply drum through heating tubes and back to the bulk supply drum, heating the oil to a cracking temperature in the heating tubes, maintaining a bed of finely divided solid material in the bulk supply drum extending entirely across the path of the circulating oil, taking off vapors from the upper part of the bulk supply drum under pressure, taking off vapors from beneath said bed under a lower pressure, subjecting the vapors so taken off to a refluxing operation, introducing raw oil into the vapors in the refluxing operation, and returning admixed reflux condensate and raw oil from the refluxing operation to the circulating oil beneath said bed.

In testimony whereof, I have subscribed my name.

EDWARD W. ISOM.